United States Patent [19]

Itoh et al.

[11] Patent Number: 4,541,510
[45] Date of Patent: Sep. 17, 1985

[54] SHIFT FORK LUBRICATING SYSTEM FOR TRANSMISSION

[75] Inventors: Kazuhito Itoh, Tokyo; Makoto Kondo, Saitama, both of Japan

[73] Assignee: Honda Giken Kogyo Kabushiki Kaisha, Tokyo, Japan

[21] Appl. No.: 513,973
[22] PCT Filed: Oct. 29, 1982
[86] PCT No.: PCT/JP82/00423
 § 371 Date: Jun. 29, 1983
 § 102(e) Date: Jun. 29, 1983
[87] PCT Pub. No.: WO83/01667
 PCT Pub. Date: May 11, 1983

[30] Foreign Application Priority Data

Oct. 29, 1981 [JP] Japan ................... 56-173203

[51] Int. Cl.$^4$ ............... F16H 57/04; G05G 3/00
[52] U.S. Cl. ................ 184/6.12; 74/467; 184/6.19
[58] Field of Search ............ 184/5, 6, 6.12, 6.11, 184/6.19, 6.28, 7, 11.1, 11.2, 100; 74/467, 605, 606 R, 694, 700, 710, 713

[56] References Cited

U.S. PATENT DOCUMENTS

| | | | |
|---|---|---|---|
| 2,328,104 | 8/1943 | Simpson | 184/6.12 X |
| 2,328,519 | 8/1943 | Wahlberg et al. | 184/6.12 X |
| 2,608,272 | 8/1952 | Rich | 184/6.12 |
| 2,981,372 | 4/1961 | Naumer | 184/6.12 |
| 3,053,115 | 9/1962 | Cartwright et al. | 184/6.12 X |
| 3,099,927 | 8/1963 | Anderson | 184/6.12 X |
| 4,148,229 | 4/1979 | Kuramochi et al. | 184/6.12 X |
| 4,222,283 | 9/1980 | Nagy | 74/467 |
| 4,329,887 | 5/1982 | Kawamoto | 74/467 |
| 4,348,914 | 9/1982 | Kawamoto | 74/467 |
| 4,368,802 | 1/1983 | Grabill et al. | 184/6.12 |

FOREIGN PATENT DOCUMENTS

| | | | |
|---|---|---|---|
| 47-24842 | 8/1972 | Japan | 74/467 |
| 54-22844 | 8/1979 | Japan | 74/467 |

Primary Examiner—David H. Brown
Assistant Examiner—John E. Griffiths
Attorney, Agent, or Firm—Armstrong, Nikaido, Marmelstein & Kubovcik

[57] ABSTRACT

Herein disclosed is a shift fork lubricating system for use in a transmission of the type in which shift forks ($4_1$, $4_3$) have their bearing portions ($10_1$, $10_3$) slidably fitted and supported on a shift fork shaft (2) and their forked pawl portions ($6_1$, $6_3$) formed at their leading ends for engagement with circumferential grooves ($8_1$, $8_2$) of shift gears ($7_1$, $7_3$) so that the shift gears ($7_1$, $7_3$) are shifted by the sliding controls of the shift forks ($4_1$, $4_3$). The bearing portions ($10_1$, $10_3$) of the shift forks ($4_1$, $4_3$) have their inner circumferences formed at their center areas with annular oil grooves ($16_1$, $16_3$), respectively, which are axially elongated and always in communication with oil ports ($14_1$, $14_3$) opened to the outer circumference of the shift fork shaft (2). The shift forks ($4_1$, $4_3$) have their inner circumferences formed at both the sides of the annular oil grooves ($16_1$, $16_3$) with pairs of sliding faces ($17_1$, $17_3$; $18_1$, $18_3$) which have a substantially equal axial length and which are made slidable on the shift fork shaft (2). The shift forks ($4_1$, $4_3$) are further formed therein with oil passages ($15_1$, $15_3$) which are opened into the forked pawl portions ($6_1$, $6_3$) thereof and which communicate with the annular oil grooves ($16_1$, $16_3$).

3 Claims, 2 Drawing Figures

SHIFT FORK LUBRICATING SYSTEM FOR TRANSMISSION

FIELD OF THE INVENTION

The present invention relates to a transmission of a vehicular engine or the like and, more particularly, to a shift fork lubricating system for the shift gear of the transmission.

BACKGROUND ART

In a transmission of a vehicular engine or the like, generally speaking, shift forks borne on a shift fork shaft in a manner to slide axially thereof are desired partly to supply a sufficient amount of lubricating oil between the forked pawl portions formed at the leading ends thereof and shift gears engaging with the pawl portions irrespective of the positions of shift forks on the shift fork shaft thereby to ensure smooth rotations of the shift gears, partly to supply a sufficient amount of lubricating oil between the shift fork shaft and the bearing portions of the shift forks thereby to ensure smooth and light sliding motions of the shift forks to the right or left, and partly to accurately move in parallel on the shift fork shaft at all times, whereby the operations of the transmission and the gear changing operations may always be conducted properly and efficiently as a whole.

DISCLOSURE OF THE INVENTION

It is a major object of the present invention to provide a shift fork lubricating system for use in a transmission, which is enabled to satisfy the aforementioned desires although it has a simple construction.

In order to achieve the aforementioned object, according to the present invention, there is provided a shift fork lubricating system for a transmission of the type wherein shift forks have their bearing portions slidably fitted and supported on a shift fork shaft and their forked pawl portions formed at their leading ends for engagement with the circumferential grooves of shift gears so that the shift gears are shifted by the sliding controls of the shift forks, the shift fork lubricating system being characterized in that the bearing portions of the shift forks have their inner circumferences formed at their center areas with annular oil grooves, respectively, which are axially elongated and which are always in communication with oil ports opened to the outer circumference of the shift fork shaft; that the shift forks have their inner circumferences formed at both the sides of the annular oil grooves with pairs of sliding faces which have a substantially equal axial length and which are made slidable on the shift fork shaft; and that the shift forks are formed therein with oil passages, respectively, which are opened to the forked pawl portions thereof and which communicate with the annular oil grooves.

According to the construction thus far described, the shift forks can always be controlled to accurately slide in parallel on the shift fork shaft, while being prevented from falling in the sliding direction, so that the sliding controls of the shift forks to the right or left can always be performed properly, smoothly and lightly.

Moreover, the sliding faces formed on the bearing portions of the shift forks are made to have a substantially equal length in the axial direction so that they can be uniformly bored by a turning or the like operation.

Still moreover, since the shift forks are provided therein with oil passages which are opened into the forked pawl portions thereof and which are communicated with the annular oil grooves, lubricating oil can be supplied through the oil ports, the annular oil grooves and the oil passages to the engagement portions between the forked pawl portions and the shift gears, no matter where the shift fork may be shifted, so that the shift forks can have their sliding faces effectively lubricated.

Furthermore, if the aforementioned forked pawl portions are formed with notched grooves which are in communication with the oil passages and which are opened into the end faces and both the side surfaces thereof, the lubricating oil flows through the oil passages to the notched grooves, from which the oil is then supplied simultaneously to the bottom faces and both the side surfaces of the circumferential grooves of the shift gears so that it can promptly lubricate all the areas of the circumferential grooves thereby to further enhance the lubricating effects between the forked pawl portions of the shift forks and the shift gears, whereby the rotations and shifts of the shift gears can be performed smoothly and lightly.

BRIEF DESCRIPTION OF THE DRAWING

In the accompanying drawing showing one embodiment of the present invention.

BEST MODE FOR EMBODYING THE INVENTION

Figure 1:
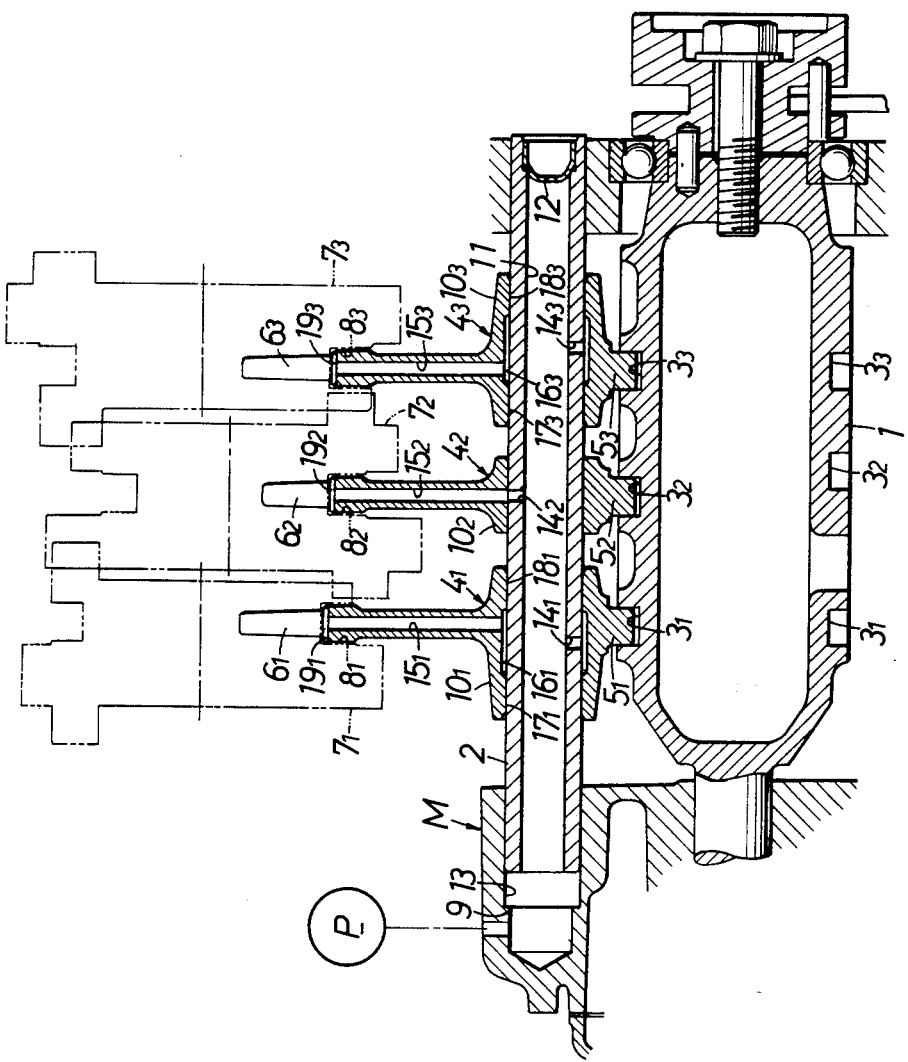
FIG. 1 is a longitudinal section thereof.

One embodiment of the present invention will be described in the following with reference to the accompanying drawing.

In a transmission casing M of an engine, there is rotatably journaled a shift drum 1 of a drum type reduction gear mechanism. In the casing M, moreover, there is supported a shift fork shaft 2 which is adjacent to the shift drum 1. The shift fork shaft 2 is made axially movable in a predetermined stroke until it abuts against the bearing hole step portion 9 of the transmission casing M.

The aforementioned shift drum 1 has its outer circumference formed with a plurality of, e.g., first to third lead grooves $3_1$, $3_2$ and $3_3$ which are longitudinally spaced from one another. On the aforementioned shift fork shaft 2, there are fitted bearing portions $10_1$, $10_2$ and $10_3$ of first to third shift forks $4_1$, $4_2$ and $4_3$ which correspond to the aforementioned first to third lead grooves $3_1$, $3_2$ and $3_3$ and of which the first and third shift forks $4_1$ and $4_3$ are made axially slidable on the shift fork shaft 2 whereas the second shift fork $4_2$ is so fixed to the shift fork shaft 2 that it can axially move integrally with said shaft 2.

From the bearing portions $10_1$, $10_2$ and $10_3$ of the first to third shift forks $4_1$, $4_2$ and $4_3$, respectively, there are integrally projected three guide pins $5_1$, $5_2$ and $5_3$ which engage with the aforementioned first to third lead grooves $3_1$, $3_2$ and $3_3$. The first to third shift forks $4_1$, $4_2$ and $4_3$ have their forked pawl portions $6_1$, $6_2$ and $6_3$ engaged with the circumferential grooves $8_1$, $8_2$ and $8_3$ of shift gears $7_1$, $7_2$ and $7_3$, respectively, which belong to a reduction gear mechanism mounted in the transmission casing M. When the shift drum 1 is rotated, as usual, intermittently by a predetermined shift angle, the first and third shift forks $4_1$ and $4_3$ are controlled to slide on the shift fork shaft 2 by the actions of the first to third lead grooves $3_1$, $3_2$ and $3_3$ of the shift drum 1, whereas only the second shift fork $4_2$ is controlled to move to the right and left together with the shift fork shaft 2, whereby the reduction gear mechanism can be shifted in plural steps.

The aforementioned shift fork shaft 2 is formed with a main oil passage 11, which has its open end (as viewed at the righthand side of FIG. 1) closed by a blind member 12 and its other open end (as viewed at the lefthand side of FIG. 1) communicating with an oil pump P by way of an oil passage 13 formed in the transmission casing M.

The aforementioned main oil passage 11 is opened into the outer circumference of the shift fork shaft 2 by way of oil ports $14_1$, $14_2$ and $14_3$ which are formed in that shaft 2. On the other hand, the aforementioned first to third shift forks $4_1$, $4_2$ and $4_3$ are formed therein with longitudinally extending oil passages $15_1$, $15_2$ and $15_3$, which have their respective one-side ends opened in the inner circumferences of the bearing portions $10_1$, $10_2$ and $10_3$ of the first to third shift forks $4_1$, $4_2$ and $4_3$ and their respective other-side ends opened in the arcuate end faces of the forked pawl portions $6_1$, $6_2$ and $6_3$ of the first to third shift forks $4_1$, $4_2$ and $4_3$.

The bearing portions $10_1$ and $10_3$ of the first and third shift forks $4_1$ and $4_3$ have their inner circumferences formed at their center areas with axially elongated annular oil grooves $16_1$ and $16_3$ and at both their sides with left and right sliding faces $17_1$ and $18_1$, and $17_3$ and $18_3$ which have a substantially equal length and which are made slidable on the outer circumference of the shift fork shaft 2.

The oil passages $15_1$ and $15_3$ of the first and third shift forks $4_1$ and $4_3$ are made to communicate with the main oil passage 11 by way of the aforementioned annular oil grooves $16_1$ and $16_3$ and the aforementioned oil ports $14_1$ and $14_3$, respectively. These communications are not blocked even if the first and third shift forks $4_1$ and $4_3$ are slid to the right and left on the shift fork shaft 2 for the gear changing operations.

On the other hand, the oil passage $15_2$ of the second shift fork $4_2$ secured to the shift fork shaft 2 is made to communicate with the main oil passage 11 by way of only the aforementioned oil port $14_2$.

Figure 2:
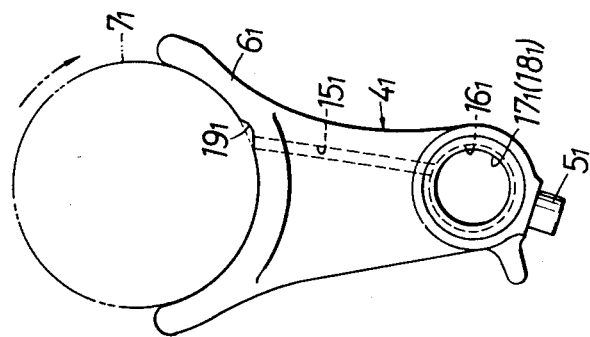
FIG. 2 is a side elevation of a first shift fork.

As better seen from FIG. 2, the forked pawl portions $6_1$, $6_2$ and $6_3$ of the first to third shift forks $4_1$, $4_2$ and $4_3$ are formed with arcuate notched grooves $19_1$, $19_2$ and $19_3$ which are opened over their arcuate end faces and two side surfaces and which are made to communicate with the aforementioned oil passages $15_1$, $15_2$ and $15_3$.

Moreover, the notched grooves $19_1$, $19_2$ and $19_3$ communicating with the aforementioned oil passages $15_1$, $15_2$ and $15_3$ are eccentrically opened at the rotationally entering sides of the shift gears $7_1$, $7_2$ and $7_3$, i.e., the sides which are rotationally (in the direction of arrow of FIG. 2) entered by the shift gears $7_1$, $7_2$ and $7_3$ relative to the first to third shift forks $4_1$, $4_2$ and $4_3$, so that the lubricating oil may be easily introduced from the oil passages $15_1$, $15_2$ and $15_3$ to the engaging and sliding portions between the arcurate end faces of the forked pawl portions $6_1$, $6_2$ and $6_3$ and the circumferencial grooves $8_1$, $8_2$ and $8_3$ of the shift gears $7_1$, $7_2$ and $7_3$ by making use of the rotations of the shift gears $7_1$, $7_2$ and $7_3$.

The operation of the embodiment of the present invention shown in FIGS. 1 and 2 will be described in the following.

Now, when the oil pump P is driven by the run of the engine, the lubricating oil under pressure is supplied from the oil passage 13 to the main oil passage 11, from which it is further supplied via the oil ports $14_1$, $14_2$ and $14_3$ and the oil passages $15_1$, $15_2$ and $15_3$ thereby to forcibly lubricate the sliding faces of the forked pawl portions $6_1$, $6_2$ and $6_3$ and the shift gears $7_1$, $7_2$ and $7_3$. Since, in this case, the notched grooves $19_1$, $19_2$ and $19_3$ communicating with the open ends of the oil passages $15_1$, $15_2$ and $15_3$ on the side of the forked pawl portions $6_1$, $6_2$ and $6_3$ are positioned at the aforementioned sides which are entered by the shift gears $7_1$, $7_2$ and $7_3$, the lubricating oil can be efficiently introduced into the clearances between the circumferential grooves $8_1$, $8_2$ and $8_3$ and the forked pawl portions $6_1$, $6_2$ and $6_3$ by making use of the rotations of the shift gears $7_1$, $7_2$ and $7_3$.

Thus, if the shift drum 1 is turned by a gear changing operation, the first and third shift forks $4_1$ and $4_3$ are slid to the right or left on the shift fork shaft 2, while being guided by the first and third lead grooves $3_1$ and $3_3$, to shift the shift gears $7_1$ and $7_3$ to the right or left. Then, the lubricating oil in the main oil passage 11 is supplied from the oil ports $14_1$ and $14_3$ via the annular oil grooves $16_1$ and $16_3$ to the clearances between left and right sliding faces $17_1$ and $18_1$, and $17_3$ and $18_3$ of the bearing portions $10_1$ and $10_3$ and the outer circumference of the shift fork shaft 2 thereby to smoothly shift the first and third shift forks $4_1$ and $4_3$. By the aforementioned long annular oil grooves $16_1$ and $16_3$, moreover, the main oil passage 11 and the oil passages $15_1$ and $15_3$ are always held in their communicating states so that the lubricating oil is supplied without any difficulty to the clearances between the sliding faces of the forked pawl portions $6_1$ and $6_3$ and the shift gears $7_1$ and $7_3$. Still morever, those left and right sliding faces $17_1$ and $18_1$, and $17_3$ and $18_3$ of the bearing portions $10_1$ and $10_3$, which have a substantially equal axial length, are associated with the shift fork shaft 2 to accurately move the first and third shift forks $4_1$ and $4_3$ in parallel while preventing them from falling down in the sliding direction.

Incidentally, since only the second shift fork $4_2$ is moved to the right and left together with the shift fork shaft 2 while being guided by the second lead groove $3_2$, the lubricating oil is supplied without any difficulty to the clearances between the sliding faces of the forked pawl portion $6_2$ and the shift gear $7_2$.

We claim:

1. In a transmission of the type including a plurality of shiftable gears each having a circumferential groove, a shift fork shaft having a hollow interior, a plurality of shift forks, each said shift fork having a leading end with a forked pawl portion engaged in one said circumferential groove of one of said shiftable gears and a bearing portion fitted on said shift fork shaft for supporting the respective shift forks, at least one said shift fork being slidable axially along said shift fork shaft, and sliding control means for moving said at least one shift fork along said shift fork shaft for shifting one of said shiftable gears, said shift fork shaft having an outer circumference, each said bearing portion having an inner circumference and a center area of said inner circumference, each of said forked pawl portion having an end face and side surfaces, a shift fork lubricating system which is characterized in that said bearing portions of said at least one slidable shift forks have their said inner circumferences formed at their said center areas with annular oil grooves which are axially elongated in the direction of sliding of said shift forks along said shift fork shaft and which are always respectively maintained in communication with said hollow interior of said shift fork shaft by corresponding oil ports opened into said outer circumference of said shift fork shaft, said slidable shift forks having their said bearing portion inner circumferences each also formed at both ends, respectively, of said annular oil grooves with sliding faces of substantially equal axial length which are slidable on said shift fork shaft and which define the respective ends of said annular oil grooves, said shift forks each being formed with oil passages therein having one end opening into said forked pawl portions thereof at locations eccentric to end face thereof rotationally entered by said shiftable gears, said oil passages being in communication at their other ends with said annular oil grooves in said bearing portions, said annular oil grooves enclosing said oil ports in said shift fork shaft.

2. A shift fork lubricating system as set forth in claim 1, further characterized in that said forked pawl portions are formed proximately said one end opening of said oil passages thereof with notched grooves which communicate with said oil passages and which open to the end faces and both the side surfaces of said forked pawl portions, respectively.

3. A shift fork lubricating system as set forth in either claim 1 or 2, further characterized in that said hollow interior of said shift fork shaft is formed as a main oil passage communicating with an oil pressure source such that lubricating oil is fed under pressure from said oil pressure source to said main oil passage, said annular oil grooves through said respective oil ports, said oil passages and said shift forks and to said mutually engaged forked pawl portions and circumferential grooves, of said shiftable gears in order.

* * * * *